(12) United States Patent
Takenaka et al.

(10) Patent No.: US 11,876,547 B2
(45) Date of Patent: Jan. 16, 2024

(54) VEHICLE-MOUNTED COMMUNICATION DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuji Takenaka, Yokkaichi (JP); Norichika Oomi, Yokkaichi (JP); Daisuke Miyawaki, Yokkaichi (JP); Kosuke Sone, Yokkaichi (JP); Suguru Yamagishi, Osaka (JP); Yutaro Miki, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/753,093

(22) PCT Filed: Aug. 11, 2020

(86) PCT No.: PCT/JP2020/030555
§ 371 (c)(1),
(2) Date: Feb. 18, 2022

(87) PCT Pub. No.: WO2021/039375
PCT Pub. Date: Mar. 4, 2021

(65) Prior Publication Data
US 2022/0302944 A1    Sep. 22, 2022

(30) Foreign Application Priority Data

Aug. 30, 2019  (JP) .................................. 2019-158037
Aug. 30, 2019  (JP) .................................. 2019-158040
Mar. 26, 2020  (JP) .................................. 2020-055821

(51) Int. Cl.
*H04B 1/3822* (2015.01)
*H04B 1/401* (2015.01)

(52) U.S. Cl.
CPC ........... *H04B 1/3822* (2013.01); *H04B 1/401* (2013.01)

(58) Field of Classification Search
CPC .................................................. H04B 1/3822
See application file for complete search history.

(56) References Cited

U.S. PATENT DOCUMENTS 6,806,838 B2 * 10/2004 Petros ................... H01Q 25/00
    343/895
7,920,585 B2 *  4/2011 Mizutani ................ H04B 3/548
    370/480

(Continued)

FOREIGN PATENT DOCUMENTS

JP    2004-208098 A    7/2004
JP    2007-267210 A   10/2007

(Continued)

OTHER PUBLICATIONS

SEI technical review Jan. 2013, Issue No. 182, Development of 1-Bit Digital Radio Frequency Transmitter.

(Continued)

*Primary Examiner* — Hsinchun Liao
(74) *Attorney, Agent, or Firm* — Honigman LLP

(57) ABSTRACT

A vehicle-mounted communication device that is to be mounted on a vehicle includes: a wireless communication unit that transmits an RF signal that includes data, and is capable of changing a communication method; an acquisition unit that acquires state information that indicates a state of the vehicle; and a control unit that performs switching (Continued)

control to change the communication method based on the state information acquired by the acquisition unit.

4 Claims, 5 Drawing Sheets

(56) References Cited

U.S. PATENT DOCUMENTS

| | | | | |
|---|---|---|---|---|
| 2005/0226201 A1* | 10/2005 | McMillin | ............. | H04W 88/04 |
| | | | | 370/348 |
| 2010/0167721 A1* | 7/2010 | Madhavan | .......... | H04M 1/6075 |
| | | | | 455/414.1 |
| 2013/0149985 A1* | 6/2013 | Yi | ........................ | H04W 76/50 |
| | | | | 455/404.1 |
| 2014/0288774 A1 | 9/2014 | Morita et al. | | |

FOREIGN PATENT DOCUMENTS

| | | | |
|---|---|---|---|
| JP | 2009-177785 A | | 8/2009 |
| JP | 2011-191946 A | | 9/2011 |
| JP | 2019-220918 A | | 12/2019 |
| WO | 2015-68726 A1 | | 5/2015 |

OTHER PUBLICATIONS 2018 by the Institute of Electronics, Information and Communication Engineers General Conference, Proceedings, Development of 1-bit bandpass ΔΣ modulator.

International Search Report, Application No. PCT/JP2020/030555, dated Nov. 2, 2020. ISA/Japan Patent Office.

* cited by examiner

VEHICLE-MOUNTED COMMUNICATION DEVICE

CROSS-REFERENCE TO RELATED APPLICATIONS

This application is the U.S. national stage of PCT/JP2020/030555 filed on Aug. 11, 2020, which claims priority of Japanese Patent Application No. JP 2019-158037 filed on Aug. 30, 2019, Japanese Patent Application No. JP 2019-158040 filed on Aug. 30, 2019, and Japanese Patent Application No. JP 2020-055821 filed on Mar. 26, 2020 the contents of which are incorporated herein.

TECHNICAL FIELD

The present invention relates to a vehicle-mounted communication device.

BACKGROUND

JP 2009-177785A discloses the following technique. Specifically, a vehicle-mounted wireless communication device includes a plurality of antennas for different frequencies, a multiplexer circuit, a demultiplexer circuit, and a plurality of radio devices corresponding to the plurality of antennas for different frequencies, wherein the plurality of antennas are connected to either the multiplexer circuit or the demultiplexer circuit, and are installed on the roof of the vehicle, on an upper portion of the windshield, or on an upper portion of the rear window, together with the multiplexer circuit or the demultiplexer circuit to which the plurality of antennas are connected, the plurality of radio devices are connected to whichever of the demultiplexer circuit or the multiplexer circuit to which the antennas are not connected, using a radio device-side antenna cables, and the multiplexer circuit and the demultiplexer circuit are connected to each other using an antenna-device side antenna cable that is routed through in a pillar.

Technologies have been developed in consideration of an increase in the number of communication services that are to be provided in vehicles.

While technologies for sharing a signal processing circuit, antennas, or the like among a plurality of different communication methods have been developed, the issue is when to switch between the communication methods in a vehicle-mounted environment where the number of communication services to be provided tends to increase.

The present disclosure has been made to solve the above-described problem, and an object of the present disclosure is to provide a vehicle-mounted communication device that is capable of appropriately switching between communication methods in a case where a signal processing circuit, an antenna, or the like is shared among a plurality of different communication methods in a vehicle.

Effects of the Invention

According to the present disclosure, in a case where a signal processing circuit, an antenna, or the like is shared among a plurality of different communication methods in a vehicle, it is possible to appropriately switch between the communication methods. SUMMARY A vehicle-mounted communication device according to the present disclosure is a vehicle-mounted communication device that is to be mounted on a vehicle, including: a wireless communication unit that transmits an RF signal that includes data, and is capable of changing a communication method; an acquisition unit that acquires state information that indicates a state of the vehicle; and a control unit that performs switching control to change the communication method based on the state information acquired by the acquisition unit.

One aspect of the present disclosure can be realized not only as a vehicle-mounted communication device that includes such characteristic processing units, but also as a method for carrying out such characteristic processing as steps, or as a program for enabling a computer to execute such steps. Also, one aspect of the present disclosure can be realized as a semiconductor integrated circuit that realizes a part or the entirety of the vehicle-mounted communication device, or can be realized as a system that includes the vehicle-mounted communication device.

DETAILED DESCRIPTION OF PREFERRED EMBODIMENTS

Figure 1:
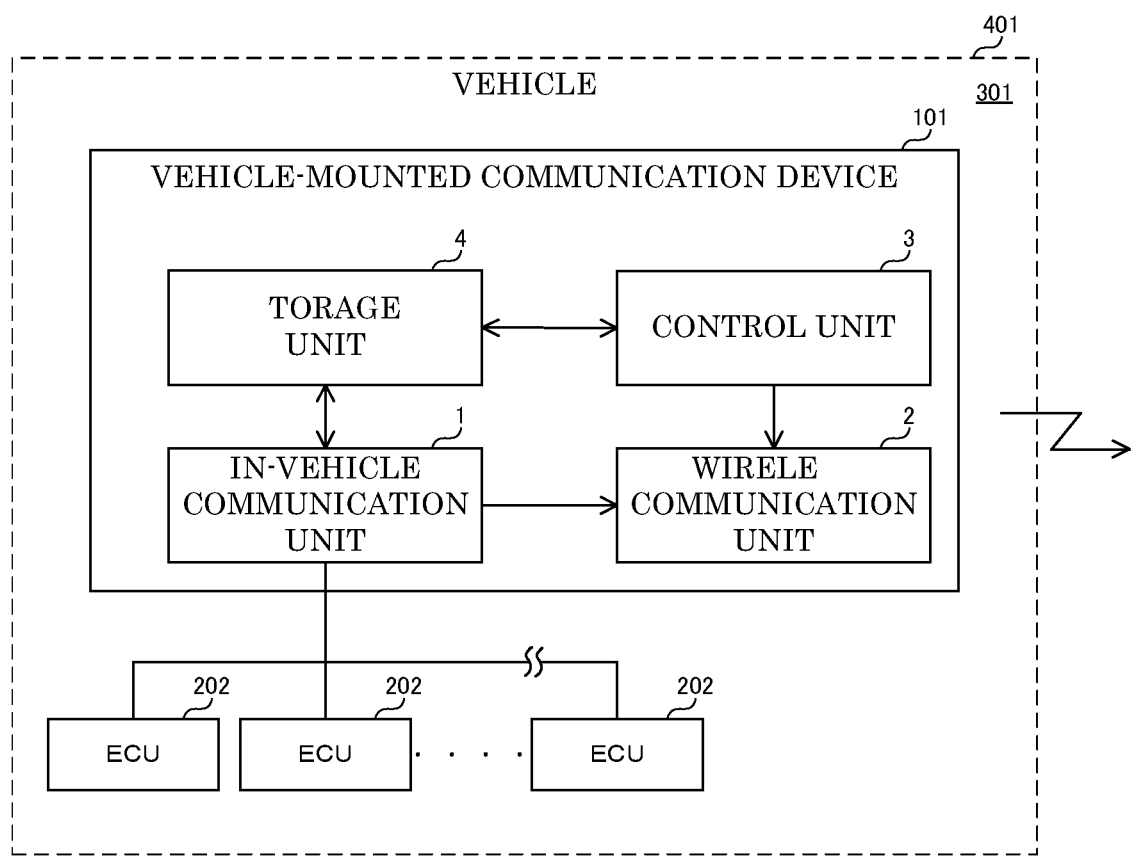
FIG. 1 is a diagram showing configurations of a vehicle-mounted communication system and a vehicle-mounted communication device according to an embodiment of the present disclosure.

First, embodiments according to the present disclosure are listed and described.

A vehicle-mounted communication device according to an embodiment of the present disclosure is a vehicle-mounted communication device that is to be mounted on a vehicle, including: a wireless communication unit that transmits an RF signal that includes data, and is capable of changing a communication method; an acquisition unit that acquires state information that indicates a state of the vehicle; and a control unit that performs switching control to change the communication method based on the state information acquired by the acquisition unit.

With such a configuration, it is possible to switch between the communication methods corresponding to various communication services provided in the vehicle, according to the state of the vehicle. Therefore, it is possible to dynamically implement the wireless function corresponding to the current state of the vehicle. As a result, it is possible to suppress an increase in the number of wireless circuits, antennas, and so on resulting from an increase in communication services that are to be provided in the vehicle, and it is possible to reduce the space for arranging parts, the vehicle weight, the manufacturing costs, and so on. Therefore, in a case where a signal processing circuit, an antenna, or the like is shared among a plurality of different communication methods in a vehicle, it is possible to appropriately switch between the communication methods.

Preferably, the wireless communication unit includes an antenna, and a wireless signal processing unit that generates an RF signal that conforms to the communication method and outputs the RF signal to the antenna, and is capable of changing the communication method, and the control unit changes the communication method for the wireless signal processing unit through the switching control.

With such a configuration, parts for generating RF signals such as a processor and a D/A converter can be shared, and the number of parts can be reduced. In addition, it is possible to respond to an increase in the number of communication services at a low cost of only adding an antenna, for example.

More preferably, the wireless communication unit further includes a filter that is connected between the wireless signal processing unit and the antenna, and the wireless signal processing unit outputs a 1-bit digital signal to the filter as the RF signal.

With such a configuration, the number of parts can further be reduced by eliminating the need for a D/A converter while a processor and so on are shared.

More preferably, the wireless communication unit includes a plurality of filters, the wireless signal processing unit is capable of outputting RF signals that conform to a plurality of communication methods in parallel from one port to the plurality of filters, and through the switching control, the control unit is capable of switching between an option to select one communication method or an option to select a plurality of communication methods for the RF signals to be generated by the wireless signal processing unit.

With such a simple configuration in which the number of ports is reduced, it is possible to switch between a state in which wireless communication is performed according to one communication method and a state in which wireless communication is performed according to a plurality of communication methods, and it is possible to provide a wider variety of communication methods according to the condition of the vehicle.

Preferably, the acquisition unit acquires the state information that indicates a state of an ignition power supply of the vehicle, and when the state information indicates an OFF state of the ignition power supply, the control unit selects a communication method corresponding to remote start, through the switching control, and when the state information indicates an ON state of the ignition power supply, the control unit selects a communication method different from the communication method corresponding to remote start, through the switching control.

With such a configuration, it is possible to select an appropriate communication method focusing on the state of the ignition power supply.

More preferably, the wireless signal processing unit is capable of outputting RF signals that conform to a plurality of communication methods selected from among remote start, ITS, wireless LAN, and TCU.

With such a configuration, it is possible to switch between useful communication methods that are widely used in a vehicle, according to the state of the vehicle.

Preferably, the wireless communication unit includes an antenna with a variable resonance frequency, and a wireless signal processing unit that generates an RF signal and outputs the RF signal to the antenna, and the control unit changes the resonance frequency of the antenna through the switching control.

With such a configuration, an antenna corresponding to a plurality of communication methods can be shared. For example, it is possible to contribute to downsizing a shark fin antenna.

Hereinafter, embodiments of the present invention will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

FIG. 1 is a diagram showing configurations of a vehicle-mounted communication system and a vehicle-mounted communication device according to an embodiment of the present disclosure. As shown in FIG. 1, a vehicle-mounted communication system 301 includes a vehicle-mounted communication device 101 and a plurality of ECUs (Electronic Control Units) 202. Note that the vehicle-mounted communication system 301 may include only one ECU 202. The vehicle-mounted communication system 301 is mounted in a vehicle 401.

The vehicle-mounted communication device 101 includes an in-vehicle communication unit 1, a wireless communication unit 2, a control unit 3, and a storage unit 4. For example, one or more or all of the in-vehicle communication unit 1, the wireless communication unit 2, and the control unit 3 are realized using a processor such as a CPU (Central Processing Unit) or a DSP (Digital Signal Processor). The storage unit 4 is a non-volatile memory, for example.

Examples of the plurality of ECUs 202 include an autonomous driving ECU (Electronic Control Unit), a sensor, a navigation device, a central gateway, a human machine interface, a camera, and so on.

The in-vehicle communication unit 1 transmits and receives data to and from the ECU 202 in conformity to the CAN (Controller Area Network) (registered trademark) communication standard. The vehicle-mounted communication system 301 need not necessarily perform data transmission and reception in conformity to the CAN communication standard, and may be configured to perform data transmission and reception in conformity to a communication standard such as Ethernet (registered trademark), FlexRay (registered trademark), MOST (Media Oriented Systems Transport) (registered trademark), or LIN (Local Interconnect Network).

For example, the in-vehicle communication unit 1 receives a CAN frame from the ECU 202, saves the data stored in the received CAN frame in the storage unit 4, or outputs the data to the wireless communication unit 2.

The wireless communication unit 2 generates and transmits an RF signal that includes the data received from the in-vehicle communication unit 1, i.e., information generated in the vehicle 401. Note that the wireless communication unit 2 may be configured to generate and transmit an RF signal that includes data generated by the vehicle-mounted communication device 101. In addition to the transmission function, the wireless communication unit 2 may also be configured to receive an RF signal transmitted from another device, acquire data included in the received RF signal, and output the data to the in-vehicle communication unit 1.

The in-vehicle communication unit 1 acquires state information that indicates the state of the vehicle 401. More specifically, the ECU 202 generates state information that indicates the state of the vehicle 401, stores the generated state information in a CAN frame, and transmits the CAN frame to the vehicle-mounted communication device 101. State information indicates, for example, the position of the vehicle 401, the type of the road on which the vehicle 401 travels, the state of the ignition power supply, the state of the accessory power supply, or the state of door lock, of the vehicle 401.

The in-vehicle communication unit 1, when serving as an acquisition unit, acquires the state information included in the CAN frame received from the ECU 202, and stores the state information in the storage unit 4.

The wireless communication unit 2 is capable of changing a communication method. For example, the wireless communication unit 2 is capable of outputting RF signals that conform to a plurality of communication methods, examples of which include remote start, ITS (Intelligent Transport System) wireless, wireless LAN (Local Area Network), TCU (Telematics Communication Unit), and radio. For example, the carrier frequency is 920 MHz for the remote start communication method, 760 MHz and 5.9 GHz for the ITS wireless communication method in Japan and the United States, respectively, 2.4 GHz for the wireless LAN communication method, and 800 MHz for the TCU communication method.

For example, when the wireless communication unit 2 has a TCU function, the wireless communication unit 2 is capable of performing wireless communication with a wireless base station outside the vehicle 401 in conformity to a communication standard such as LTE (Long Term Evolution) or 3G.

The control unit 3 performs switching control to change the communication method for the wireless communication unit 2, based on the state information acquired by the in-vehicle communication unit 1. The control unit 3 references the state information stored in the storage unit 4, for example, and outputs control information that indicates one or more communication methods, to the wireless communication unit 2.

Example 1 of Wireless Communication Unit

Figure 2:
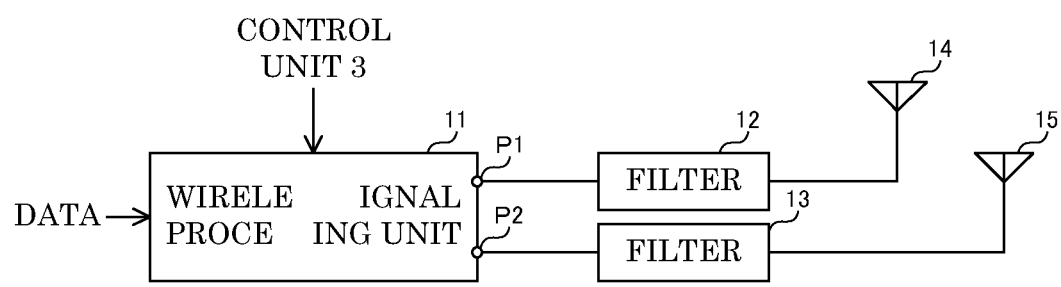
FIG. 2 is a diagram showing a configuration of Example 1 of the wireless communication unit in the vehicle-mounted communication device according to an embodiment of the present disclosure.

FIG. 2 is a diagram showing a configuration of Example 1 of the wireless communication unit in the vehicle-mounted communication device according to an embodiment of the present disclosure. As shown in FIG. 2, the wireless communication unit 2 includes a wireless signal processing unit 11, filters 12 and 13, and antennas 14 and 15. The wireless communication unit 2 is an example of a so-called software defined radio (SDR) communication device.

The wireless signal processing unit 11 performs various signal processing such as modulation on data received from the in-vehicle communication unit 1, and generates an RF signal that is an analog signal that includes the processed data. This RF signal is a signal that has a spectrum within a predetermined frequency band, and has a low noise level in other bands. The wireless signal processing unit 11 transmits the generated RF signal to a device outside the vehicle 401 such as a wireless base station, or a device inside the vehicle 401 such as a smartphone, via the filters and the antennas.

For example, the wireless signal processing unit 11 is capable of outputting RF signals that conform to two communication methods of the remote start, ITS, wireless LAN, and TCU communication methods. The wireless signal processing unit 11 is capable of changing a communication method, and generates an RF signal that conforms to a communication method, and outputs the RF signal to the antenna corresponding thereto. That is to say, the wireless signal processing unit 11 outputs an RF signal that conforms to one communication method selected from among the plurality of communication methods, to the antenna corresponding thereto.

The control unit 3 changes the communication method for the wireless signal processing unit 11, through switching control. More specifically, the wireless signal processing unit 11 selects one communication method from among the plurality of communication methods, for example, by changing communication parameters such as the modulation method, the carrier frequency, and the data rate according to the communication method indicated by the control information received from the control unit 3. When the control information indicates a communication method 1, the wireless signal processing unit 11 outputs an RF signal that conforms to the communication method 1, to the filter 12 via a port P1 corresponding thereto. When the control information indicates a communication method 2, the wireless signal processing unit 11 outputs an RF signal that conforms to the communication method 2, to the filter 13 via a port P2 corresponding thereto.

The filters 12 and 13 are provided in correspondence with different communication methods, and are connected between the wireless signal processing unit 11 and the antennas 14 and 15, respectively. The filters 12 and 13 are BPFs (Band Pass Filters), for example, and attenuate a frequency component outside a predetermined frequency band, of the frequency components of the RF signals received from the wireless signal processing unit 11. The pass bands of the filters 12 and 13 are different from each other. The RF signals passing through the filters 12 and 13 are respectively transmitted to the antennas 14 and 15.

Note that the wireless signal processing unit 11 may be capable of outputting RF signals corresponding to three or more kinds of communication methods. If this is the case, the wireless communication unit 2 includes three or more filters and three or more antennas corresponding to the communication methods. The wireless signal processing unit 11 outputs an RF signal corresponding to one communication method selected from among the three or more communication methods, to the filter corresponding thereto.

The in-vehicle communication unit 1 acquires state information that indicates the state of the ignition power supply of the vehicle 401, for example. The control unit 3 selects different communication methods when the state information indicates an ON state and when the state information indicates an OFF state, of the ignition power supply. Specifically, when the state information indicates the OFF state of the ignition power supply, the control unit 3 selects the communication method corresponding to the remote start through switching control. When the state information indicates the ON state of the ignition power supply, the control unit 3 selects a communication method other than the communication method corresponding to the remote start, such as the ITS, through switching control.

That is to say, when the ignition power supply is in the OFF state, i.e., when the engine of the vehicle 401 has not been started, there is less need to use the ITS, and therefore the ITS communication method is selected after the engine has been started. Also, when the ignition power supply is in the ON state, i.e., when the engine of the vehicle 401 has been started, there is no need to use the remote start, and therefore the remote start communication method is selected before the engine has been started.

Example 2 of Wireless Communication Unit

Figure 3:
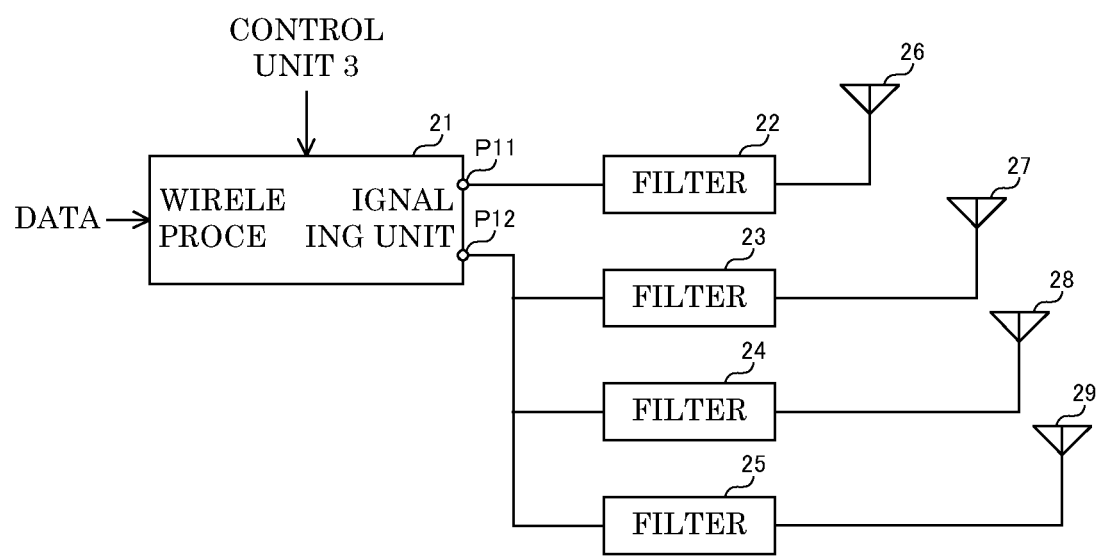
FIG. 3 is a diagram showing a configuration of Example 2 of the wireless communication unit in the vehicle-mounted communication device according to an embodiment of the present disclosure.

FIG. 3 is a diagram showing a configuration of Example 2 of the wireless communication unit in the vehicle-mounted communication device according to an embodiment of the present disclosure. As shown in FIG. 3, the wireless communication unit 2 includes a wireless signal processing unit 21, filters 22 to 25, and antennas 26 to 29. The wireless communication unit 2 is an example of a so-called software defined radio communication device. Specifically, the wireless communication unit 2 has the same function as the 1-bit digital radio frequency transmitter described in the publication entitled "SEI technical review, Jan. 2013 Issue No. 182, Development of 1-Bit Digital Radio Frequency Transmitter", Sumitomo Electric Industries, Ltd., Jan. 2013, P 90-94, by Takashi MAEHATA et al., ("Maehata").

The wireless signal processing unit 21 performs various signal processing such as modulation on data received from the in-vehicle communication unit 1, and generates an RF signal that includes the processed data. More specifically, the wireless signal processing unit 21 generates a 1-bit digital signal as an RF signal by performing orthogonal modulation as the primary modulation, and bandpass delta-sigma modulation as the secondary modulation. This RF signal is a signal that has a spectrum within a predetermined frequency band, and the noise level in other bands is equivalent to the level of the spectrum. In this RF signal, information regarding the amplitude and the phase appears as the state of being sparse or dense of bit strings on the time axis.

The wireless signal processing unit 21 transmits the generated RF signal to a device outside the vehicle 401 such as a wireless base station, or a device inside the vehicle 401 such as a smartphone, via the filters 22 to 25 and the antennas 26 to 29. For example, the wireless signal processing unit 21 is capable of outputting RF signals that conform to the remote start, ITS, wireless LAN, or TCU communication methods.

The filters 22 to 25 are provided in correspondence with different communication methods, and are connected between the wireless signal processing unit 21 and the antennas 26 to 29, respectively. The filters 22 to 25 are BPFs, for example, and attenuate a frequency component outside a predetermined frequency band, of the frequency components of the RF signals received from the wireless signal processing unit 21. The pass bands of the filters 22 to 25 are different from each other. The RF signals that have passed through the filters 22 to 25 are respectively transmitted to the antennas 26 to 29.

The wireless signal processing unit 21 is capable of changing a communication method, and generates an RF signal that conforms to a communication method, and outputs the RF signal to the antenna corresponding thereto. That is to say, the wireless signal processing unit 21 outputs RF signals that conform to one or more communication methods selected from among the plurality of communication methods, to the antennas corresponding thereto, respectively.

The control unit 3 changes the communication method for the wireless signal processing unit 21, through switching control. More specifically, the wireless signal processing unit 21 selects one communication method from among the plurality of communication methods, for example, by changing communication parameters such as the modulation method, the carrier frequency, and the data rate according to the communication method indicated by the control information received from the control unit 3. When the control information indicates a communication method 1, the wireless signal processing unit 21 outputs an RF signal that conforms to the communication method 1, to the filter 22 via a port P11 corresponding thereto. When the control information indicates a communication method 2, 3, or 4, the wireless signal processing unit 21 outputs an RF signal that conforms to the communication method 2, 3, or 4, to the filter 23, 24, or 25, via a port P12 corresponding thereto. The RF signal that has passed through the filter corresponding to the selected communication method, of the filters 23 to 25, is transmitted to the antenna corresponding thereto.

Alternatively, for example, the wireless signal processing unit 21 is capable of outputting RF signals that conform to a plurality of communication methods in parallel from one port P12 to the plurality of filters 23 to 25.

If this is the case, through switching control, the control unit 3 is capable of switching between an option to select one communication method or an option to select a plurality of communication methods for the RF signals to be generated by the wireless signal processing unit 21. More specifically, when the control information indicates any two or all of the communication methods 2 to 4, the wireless signal processing unit 21 superimposes RF signals that conform to the plurality of communication methods indicated by the control information, and outputs the RF signals to the filters 23 to 25 via the port P12 corresponding thereto.

Note that the wireless signal processing unit 21 may be capable of outputting RF signals corresponding to two or four or more kinds of communication methods in parallel. If this is the case, the wireless communication unit 2 includes two or four or more filters and two or four or more antennas for receiving RF signals from one port, in correspondence with the communication methods.

The wireless signal processing unit 21 is not limited to being configured to superimposing and outputting RF signals that conform to a plurality of communication methods, and may be configured to output RF signals that conform to the communication methods in time division. Also, the wireless communication unit 2 may be configured without the port P11, the filter 22, or the antenna 26.

The in-vehicle communication unit 1 acquires state information that indicates the state of the ignition power supply of the vehicle 401, for example. When the state information indicates the OFF state of the ignition power supply, the control unit 3 selects the communication method corresponding to the remote start through switching control. When the state information indicates the OFF state of the ignition power supply, the control unit 3 selects communication methods corresponding to the ITS, the wireless LAN, and the TCU through switching control.

For example, if the port P11 corresponds to the ITS and the port P12 corresponds to the remote start, the wireless LAN, and the TCU, when the ignition power supply is in the OFF state, the wireless signal processing unit 21 outputs an RF signal that conforms to the communication method corresponding to the remote start, from the port P12. On the other hand, when the ignition power supply is in the ON state, the wireless signal processing unit 21 outputs an RF signal that conforms to the communication method corresponding to the ITS, from the port P11, and superimposes and outputs the RF signal that conforms to the communication method corresponding to the wireless LAN and the RF signal that conforms to the communication method corresponding to the TCU, from the port P12.

That is to say, when the ignition power supply is in the OFF state, i.e., when the engine of the vehicle 401 has not been started, there is less need to use the ITS, the wireless LAN, or the TCU, and therefore the ITS, the wireless LAN, and the TCU communication methods are selected after the engine has been started. Also, when the ignition power supply is in the ON state, i.e., when the engine of the vehicle 401 has been started, there is no need to use the remote start, and therefore the remote start communication method is selected before the engine has been started.

Modification 1

In Examples 1 and 2 of the wireless communication unit 2, the in-vehicle communication unit 1 acquires state information that indicates whether the vehicle 401 is located on a general road or is located on a highway. When the state information indicates a general road, the control unit 3 selects a communication method corresponding to the ITS, through switching control, and when the state information indicates a highway, the control unit 3 selects a communication method corresponding to at least either the wireless LAN or the TCU, through switching control.

That is to say, when the vehicle 401 is located on a general road, it is highly necessary to use the ITS at an intersection or the like, and therefore the ITS communication method is to be selected. When the vehicle 401 is located on a highway, there is less need to use the ITS because there is no intersection or the like, and therefore the wireless LAN or the TCU communication method is to be selected.

Note that the control unit 3 may be configured to change the communication method for the wireless communication unit 2 depending on the region or country of the vehicle 401 indicated by the state information.

Modification 2

In Examples 1 and 2 of the wireless communication unit 2, the in-vehicle communication unit 1 acquires state information that indicates whether the doors of the vehicle 401 are in a locked state or an unlocked state. When the state information indicates the locked state, the control unit 3 selects the communication method corresponding to the remote start through switching control, and when the state information indicates the unlocked state, the control unit 3 selects a communication method corresponding to at least one of the ITS, the wireless LAN, and the TCU, through switching control.

That is to say, when the doors of the vehicle 401 are in the locked state, there is less need to use the ITS, the wireless LAN, or the TCU, and therefore the remote start communication method is to be selected. When the doors of the vehicle 401 are in the unlocked state, there is less need to use the remote start, and therefore the ITS, the wireless LAN, or the TCU communication method is to be selected.

Example 3 of Wireless Communication Unit

Figure 4:
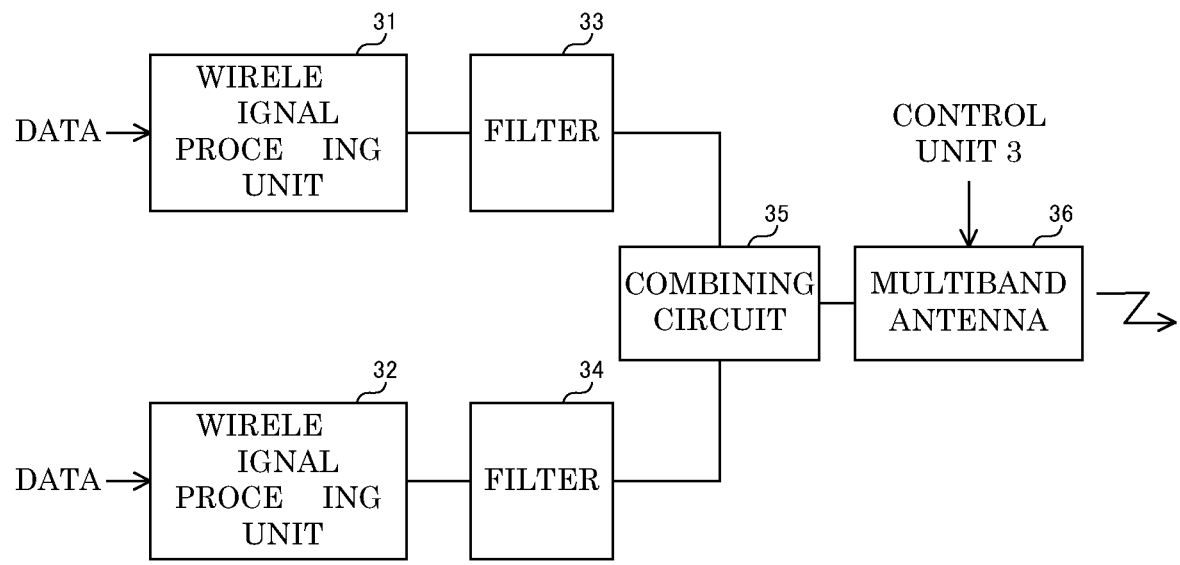
FIG. 4 is a diagram showing a configuration of Example 3 of the wireless communication unit in the vehicle-mounted communication device according to an embodiment of the present disclosure.

FIG. 4 is a diagram showing a configuration of Example 3 of the wireless communication unit in the vehicle-mounted communication device according to an embodiment of the present disclosure. As shown in FIG. 4, the wireless communication unit 2 includes a wireless signal processing units 31 and 32, filters 33 and 34, a combining circuit 35, and a multiband antenna 36.

The wireless signal processing units 31 and 32 perform various signal processing such as modulation on data received from the in-vehicle communication unit 1, and generates an RF signal that is an analog signal that includes the processed data. This RF signal is a signal that has a spectrum within a predetermined frequency band, and has a low noise level in other bands. The wireless signal processing units 31 and 32 do not have the function of changing a communication method unlike a software defined radio communication device, and output RF signals that conform to specific communication methods that are different from each other.

The wireless signal processing units 31 and 32 transmit the generated RF signals to a device outside the vehicle 401 such as a wireless base station, or a device inside the vehicle 401 such as a smartphone, via the filters 33 and 34, the combining circuit 35, and the multiband antenna 36.

The filters 33 and 34 are provided in correspondence with different communication methods. The filters 33 and 34 are BPFs, for example, and attenuate a frequency component outside a predetermined frequency band, of the frequency components of the RF signals received from the wireless signal processing units 31 and 32. The pass bands of the filters 33 and 34 are different from each other. The RF signals that have passed through the filters 33 and 34 are transmitted to the combining circuit 35.

The combining circuit 35 combines the RF signal that has passed through the filter 33 and the RF signal that has passed through the filter 34, and outputs the combined signals to the multiband antenna 36.

The resonance frequency of the multiband antenna 36 can be changed. The control unit 3 changes the resonance frequency of the multiband antenna 36 through switching control. More specifically, the multiband antenna 36 changes the resonance frequency according to the communication method indicated by the control information received from the control unit 3, by, for example, changing the antenna length using a switch or the like, or changing the voltage applied to a varactor diode in a matching circuit. An RF signal corresponding to the resonance frequency thus changed is output from the multiband antenna 36. As a result, in the wireless communication unit 2, one communication method is selected from among a plurality of communication methods.

Note that the wireless communication unit 2 may include a wireless signal processing unit corresponding to three or more kinds of communication methods. If this is the case, the wireless communication unit 2 includes three or more filters in correspondence with the communication methods, and the multiband antenna 36 is configured so that one resonance frequency can be selected from among three or more resonance frequencies.

Example 4 of Wireless Communication Unit

Figure 5:
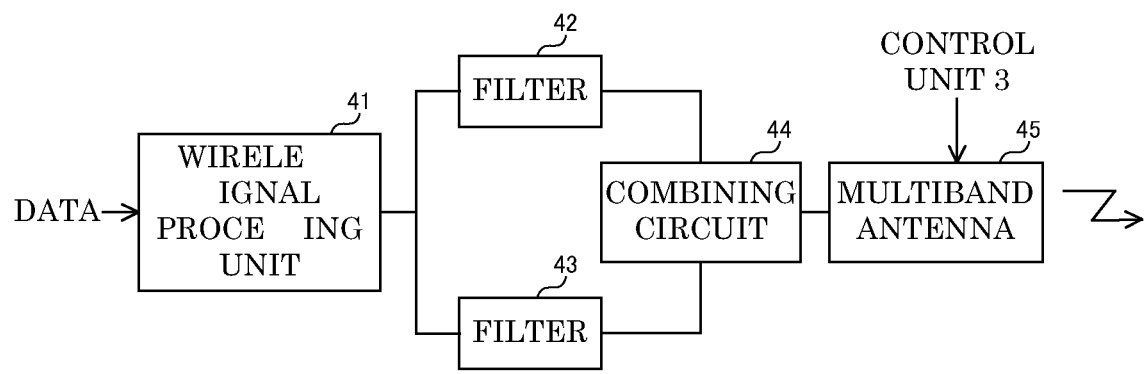
FIG. 5 is a diagram showing a configuration of Example 4 of the wireless communication unit in the vehicle-mounted communication device according to an embodiment of the present disclosure.

FIG. 5 is a diagram showing a configuration of Example 4 of the wireless communication unit in the vehicle-mounted communication device according to an embodiment of the present disclosure. As shown in FIG. 5, the wireless communication unit 2 includes a wireless signal processing unit 41, filters 42 and 43, a combining circuit 44, and a multiband antenna 45.

The wireless signal processing unit 41 performs various signal processing such as modulation on data received from the in-vehicle communication unit 1, and generates an RF signal that includes the processed data. More specifically, as with the wireless signal processing unit 21 shown in FIG. 3, the wireless signal processing unit 41 has the same function as the 1-bit digital radio frequency transmitter described in Maehata. The wireless signal processing unit 41 generates a 1-bit digital signal as an RF signal by performing orthogonal modulation as the primary modulation, and bandpass delta-sigma modulation as the secondary modulation. The wireless signal processing unit 41 does not have the function of changing a communication method, for example, and superimposes and outputs RF signals that conform to specific communication methods that are different from each other.

The wireless signal processing unit 41 transmits the generated RF signals to a device outside the vehicle 401 such as a wireless base station, or a device inside the vehicle 401 such as a smartphone, via the filters 42 and 43, the combining circuit 44, and the multiband antenna 45.

The filters 42 and 43 are provided in correspondence with different communication methods. The filters 42 and 43 are BPFs, for example, and attenuate a frequency component outside a predetermined frequency band, of the frequency components of the RF signals received from the wireless signal processing unit 41. The pass bands of the filters 42 and 43 are different from each other. The RF signals that have passed through the filters 42 and 43 are transmitted to the combining circuit 44.

The combining circuit 44 combines the RF signal that has passed through the filter 42 and the RF signal that has passed through the filter 43, and outputs the combined signals to the multiband antenna 45.

The resonance frequency of the multiband antenna 45 can be changed. The control unit 3 changes the resonance frequency of the multiband antenna 45 through switching control. More specifically, the multiband antenna 45 changes the resonance frequency according to the communication method indicated by the control information received from the control unit 3, by, for example, changing the antenna length using a switch or the like, or changing the voltage applied to a varactor diode in a matching circuit. An RF signal corresponding to the resonance frequency thus changed is output from the multiband antenna 45. As a result, in the wireless communication unit 2, one communication method is selected from among a plurality of communication methods.

Note that the wireless signal processing unit 41 may be capable of outputting RF signals corresponding to three or more kinds of communication methods. If this is the case, the wireless communication unit 2 include three or more filters in correspondence with the communication methods, and the multiband antenna 45 is configured so that one resonance frequency can be selected from among three or more resonance frequencies.

In Examples 3 and 4 of the wireless communication unit, the in-vehicle communication unit 1 acquires state information that indicates whether the vehicle 401 has received a communication instruction from another ITS wireless device, or a communication instruction from a TCU server. When the state information indicates an ITS communication instruction, the control unit 3 selects a communication method corresponding to the ITS through switching control, and when the state information indicates a TCU communication instruction, the control unit 3 selects a communication method corresponding to the TCU through switching control.

That is to say, it is possible to realize a vehicle-mounted communication device that is more suitable for a multiband antenna with which switching is performed between the ITS communication method and the TCU communication method that employ similar carrier frequencies in Japan.

Note that the specific examples of switching control in the above-described examples of the wireless communication unit 2 may be applied to another example of the wireless communication unit 2.

Here, while technologies for sharing a signal processing circuit, antennas, or the like among a plurality of different communication methods have been developed, the issue is when to switch between the communication methods in a vehicle-mounted environment where the number of communication services to be provided tends to increase.

In the vehicle-mounted communication device according to the embodiment of the present disclosure, the wireless communication unit 2 transmits an RF signal that includes data, and is capable of changing a communication method. The in-vehicle communication unit 1 acquires state information that indicates the state of the vehicle 401. The control unit 3 performs switching control to change the communication method for the wireless communication unit 2, based on the state information acquired by the in-vehicle communication unit 1.

With such a configuration, it is possible to switch between the communication methods corresponding to various communication services provided in the vehicle 401, according to the state of the vehicle 401. Therefore, it is possible to dynamically implement the wireless function corresponding to the current state of the vehicle 401. As a result, it is possible to suppress an increase in the number of wireless circuits, antennas, and so on resulting from an increase in communication services that are to be provided in the vehicle 401, and it is possible to reduce the space required for arranging parts, the vehicle weight, the manufacturing costs, and so on. Therefore, with the vehicle-mounted communication device according to the embodiment of the present disclosure, in a case where a signal processing circuit, an antenna, or the like is shared among a plurality of different communication methods in a vehicle, it is possible to appropriately switch between the communication methods.

Note that some or all of the constituent elements and operations of the examples of the vehicle-mounted communication device according to the embodiment of the present disclosure can be combined with each other as appropriate.

The foregoing embodiments are to be construed in all respects as illustrative and not restrictive. The scope of the present invention is defined by the claims rather than the description above, and is intended to include all modifications within the meaning and scope of the claims and equivalents thereof.

The above description includes the features described in the following supplementary note.

Supplementary Note 1

A vehicle-mounted communication device that is to be mounted on a vehicle, including:

a wireless communication unit that transmits an RF signal that includes data, and is capable of changing a communication method;

an acquisition unit that acquires state information that indicates a state of the vehicle; and a control unit that performs switching control to change the communication method based on the state information acquired by the acquisition unit, wherein the control unit selects different communication methods when the state information indicates an ON state and when the state information indicates an OFF state, of the ignition power supply.

The invention claimed is:

1. A vehicle-mounted communication device that is to be mounted on a vehicle, comprising:

a wireless communication unit that transmits an RF (Radio Frequency) signal that includes data, and is capable of changing a communication method;

an acquisition unit that acquires state information that indicates a state of the vehicle; and a control unit that performs switching control to change the communication method based on the state information acquired by the acquisition unit, wherein the wireless communication unit includes an antenna, and a wireless signal processing unit that generates an RF signal that conforms to the communication method and outputs the RF signal to the antenna, and is capable of changing the communication method, and a filter that is connected between the wireless signal processing unit and the antenna, and the wireless signal processing unit outputs a 1-bit digital signal to the filter as the RF signal, wherein the wireless communication unit includes a plurality of filters, the wireless signal processing unit is capable of superimposing RF signals that conform to a plurality of communication methods and outputting the RF signals from one port to the plurality of filters, and through the switching control, the control unit is capable of switching between an option to select one communication method or an option to select a plurality of communication methods for the RF signals to be generated by the wireless signal processing unit.

2. The vehicle-mounted communication device according to claim 1, wherein the acquisition unit acquires the state information that indicates a state of an ignition power supply of the vehicle, and when the state information indicates an OFF state of the ignition power supply, the control unit selects a communication method corresponding to remote start, through the switching control, and when the state information indicates an ON state of the ignition power supply, the control unit selects a communication method different from the communication method corresponding to remote start, through the switching control.

3. The vehicle-mounted communication device according to claim 1, wherein the wireless signal processing unit is capable of outputting RF signals that conform to a plurality of communication methods selected from among remote start, ITS (Intelligent Transport System), wireless LAN (Local Area Network), and TCU (Telematics Communication Unit).

4. A vehicle-mounted communication device that is to be mounted on a vehicle, comprising:

a wireless communication unit that transmits an RF (Radio Frequency) signal that includes data, and is capable of changing a communication method;

an acquisition unit that acquires state information that indicates a state of the vehicle; and a control unit that performs switching control to change the communication method based on the state information acquired by the acquisition unit, wherein the wireless communication unit includes a multiband antenna with a variable resonance frequency, and a wireless signal processing unit that superimposes RF signals that conform to a plurality of communication methods and outputs the RF signals, and a plurality of filters that respectively correspond to the plurality of communication methods and receive the superimposed and output RF signals, and a combining circuit that combines the RF signal that has passed through the filters and outputs the combined signals to the multiband antenna, and the multiband antenna changes the resonance frequency according to the communication method indicated by the control information received from the control unit and outputs the RF signal corresponding to the communication method.

* * * * *